United States Patent [19]

Lin

[11] Patent Number: 5,076,120
[45] Date of Patent: Dec. 31, 1991

[54] ELECTRIC WRENCH

[76] Inventor: Pi-Chu Lin, No. 157-8, Hu-Tzu Nei, Hu-Nei Li, Chia-Yi City, Taiwan

[21] Appl. No.: 606,433

[22] Filed: Oct. 31, 1990

[51] Int. Cl.⁵ .................. B25B 21/00; F16D 27/00
[52] U.S. Cl. ............................. 81/54; 81/467; 81/473; 192/104 R; 192/84 PM; 192/84 C
[58] Field of Search .............. 81/52, 54, 467, 469, 81/473–476; 173/5, 12; 192/104 R, 103 A, 105 C, 84 PM, 84 A, 84 C

[56] References Cited

U.S. PATENT DOCUMENTS

| 2,618,186 | 11/1952 | Mayer | 81/473 |
| 3,404,767 | 10/1968 | Farnum | 192/104 R |
| 3,783,716 | 1/1974 | Saito | 81/473 |
| 4,418,765 | 12/1983 | Mori et al. | 173/12 |

FOREIGN PATENT DOCUMENTS

| 0255433 | 2/1988 | European Pat. Off. | 81/467 |
| 0062739 | 5/1981 | Japan | 81/467 |

Primary Examiner—D. S. Meislin
Attorney, Agent, or Firm—Ostrolenk, Faber, Gerb & Soffen

[57] ABSTRACT

An electric wrench includes a motor, an electromagnetically controlled clutch comprising electromagnet members and temporary-magnetizable members, a centrifugal control switch to de-energize the electromagnet members when the drive shaft connected to the motor spins at a predetermined rate of rotation and to energize the electromagnet members when the drive shaft spins slower than the predetermined rate of rotation, and a centrifugal swinging device for actuating the centrifugal controlled switch.

3 Claims, 6 Drawing Sheets

ELECTRIC WRENCH

BACKGROUND OF THE INVENTION

The invention relates to an electric wrench, more particularly, to an electric wrench which uses a low power motor but instantly reaches high rotation speed, so that it can accomplish a given task, that is tightening or loosening a screw or nut, as effectively as models with larger motors.

Referring to FIGS. 1 and 2, a conventional electric wrench includes a housing H enclosing a motor A with an axle A2; a transmission gear assembly B associated with the axle of the motor A; the base end of a drive shaft C fixedly attached to the gear assembly B, a pair of grooves C2 on the other end of the drive shaft C, into which buffing balls D2 can be disposed; a drive sleeve E having a pair of opposed grooves E1 inside its bore and sleeved over the drive shaft, the buffing balls D2 engaging the two pairs of grooves of the drive sleeve and the drive shaft, the drive sleeve further having a pair of engaging ends extending axially therefrom; the base end of a driven shaft F having two engaging ends F1, being adapted to engage with the pair of engaging ends E2 of the drive sleeve, the top end of said driven shaft having a throughbore F2 in which a tool can be inserted, and a throughhole F3 passing through the through bore F2 adjacent to the top end of the same; a coil spring D1 disposed around the drive shaft urging the drive sleeve to the driven shaft so that the two pairs of engaging ends can engage each other; a clamping means G sleeved on the front end of the driven shaft F and clamping said tool, which exists outside of the front portion H2 of the housing H, as shown in FIG. 2.

In order to achieve high torsion and high speed, the conventional wrench has to use a motor of high power. This is only because at the beginning or end of a given task, high torsion is required to overcome increased friction at that stage. However, the intermediate stage between the beginning and the end of securing operation, does not require such high power, so conventional electric wrenches waste energy.

SUMMARY OF THE INVENTION

The main object of the present invention is to provide an electric wrench which uses a low power motor to accomplish a given task as effectively as conventional electric wrenches do, thereby saving energy.

According to the present invention, an electric wrench includes: a housing enclosing a motor having an axle; a transmission gear assembly connected to the axle of the motor; a drive shaft connected to the gear assembly at the rear end and having splined grooves of a predetermined length axially formed on the front end; a drive sleeve having two engaging pegs and inner keys extending axially along the throughbore disposed around the drive shaft, engaging the splined grooves by means of its inner keys. The rear end of a driven shaft has two engaging pegs which are adapted to engage the two engaging pegs of the drive sleeve. The front end of said driven shaft clamps a tool. A coil spring is disposed around the drive shaft to urge the drive sleeve towards the driven shaft so that two pairs of engaging pegs can engage each other.

An electromagnetically controlled clutch includes electromagnet members provided around the rear end of the drive shaft and temporary-magnetizable members provided around the rear end of the drive sleeve. The temporary-magnetizable members are not rotatable with the drive sleeve but are movable axially on it, because a bearing is disposed between the drive sleeve and the temporary-magnetizable members so the drive sleeve is not magnetized. The temporary-magnetizable members are attracted by the electromagnet members and move towards them, against the biasing force of the coil spring, when the electromagnet members are energized thereby causing the drive sleeve to disengage from the driven shaft.

A centrifugally controlled switch de-energizes the electromagnet members when the drive shaft reaches a predetermined rate of rotation and re-energizes the electromagnet members when the drive shaft slows to a speed lower than that predetermined rate. A centrifugal swinging means actuates the centrifugal controlled switch.

BRIEF DESCRIPTION OF THE DRAWINGS

Other features and advantages of the present invention will become apparent in the following detailed description, including drawings, all of which show a non-limiting form of the invention, and of which.

DETAILED DESCRIPTION OF THE PREFERRED EMBODIMENT

Figure 1:
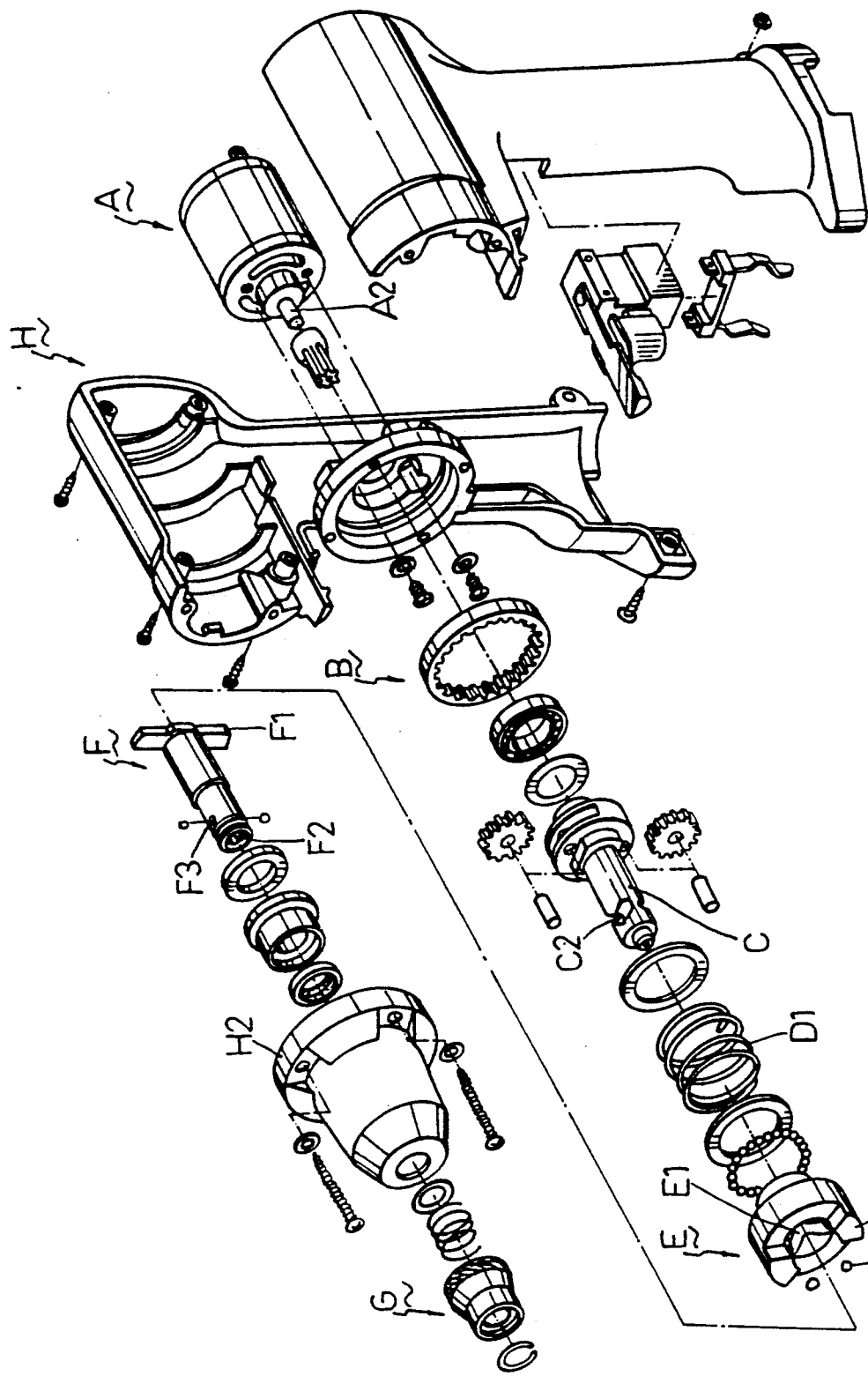
FIG. 1 shows an exploded view of an electric wrench of the prior art.
Figure 2:
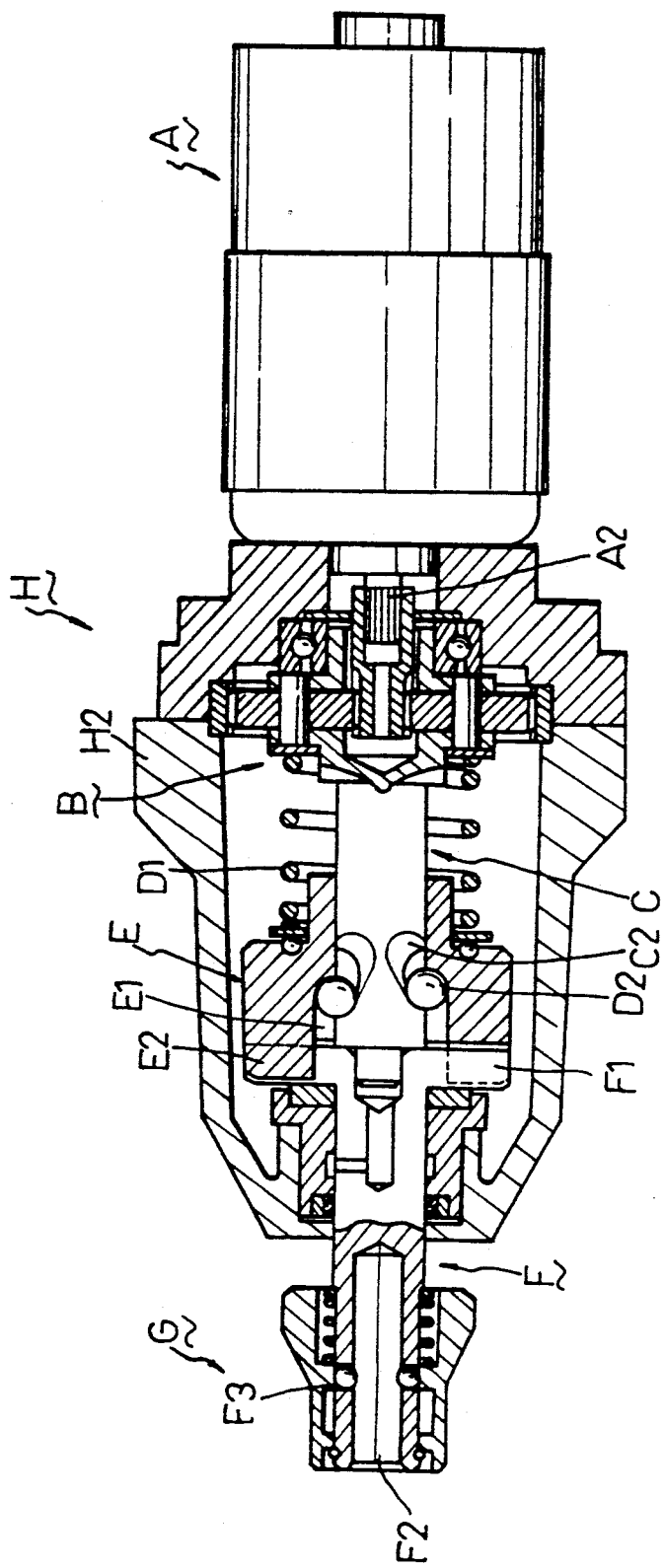
FIG. 2 shows a cross sectional view of an electric wrench of FIG. 1.
Figure 3:
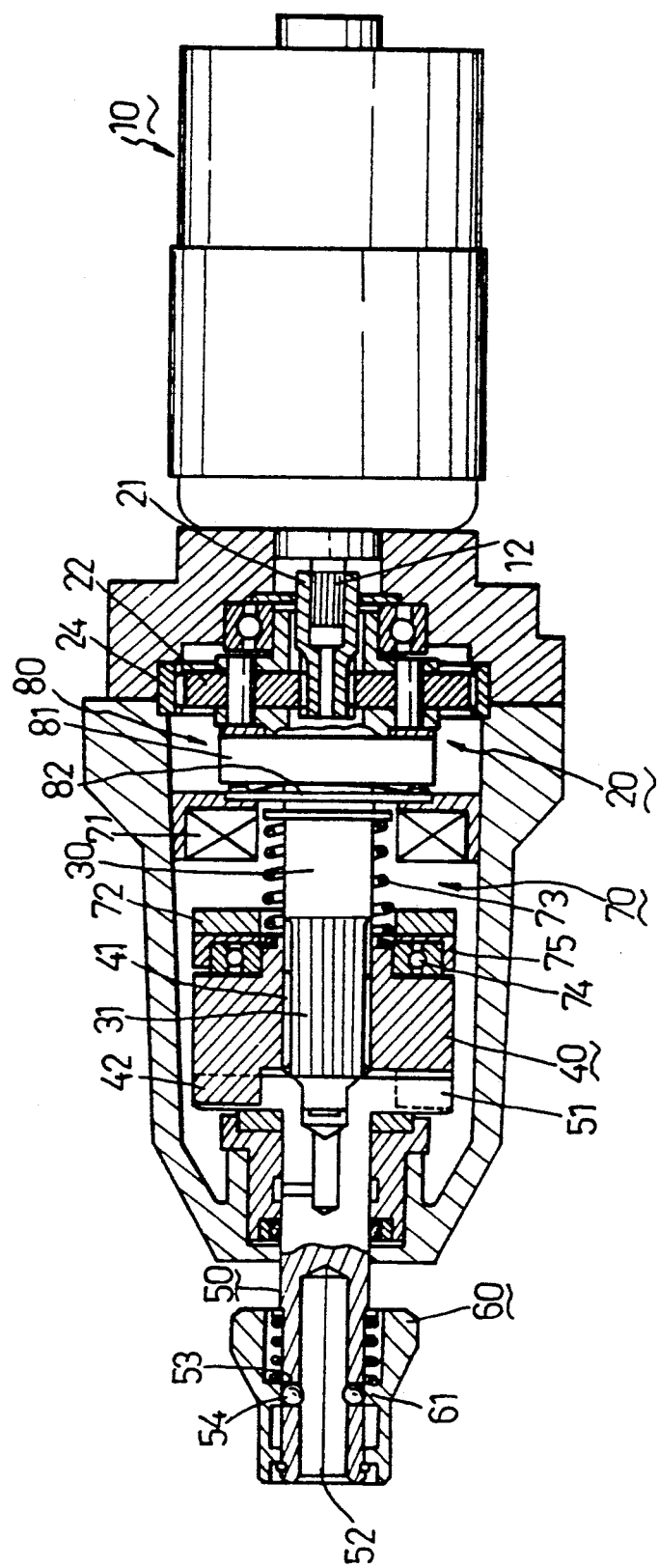
FIGS. 3 and 6 show a cross sectional view of an electric wrench according to the present invention.

FIG. 3 shows a cross sectional view of an electric wrench according to the present invention. Accordingly, it includes a motor 10, a transmission gear assembly 20, a drive shaft 30, a drive sleeve 40, a driven shaft 50, a clamping means 60, an electromagnetically controlled clutch 70, a centrifugally controlled means 80 includes a centrifugal controlled switch 82 and a centrifugal swinging means 81 for controlling the electromagnet members 80.

The housing encloses a motor 10 which includes an axle 12. This motor has horse power lower than those in prior art electric wrenches. A transmission gear assembly 20 includes a gear shaft 21 fixedly connected to the axle 12 of the motor 10, and an enforcing outer plate 24 having inwardly spaced teeth disposed around the gear shaft. The rear end of the drive shaft 30 is securely connected to the gear shaft, and a plurality of splined grooves 31 are formed axially on the outer surface of the front end of the drive shaft. At least two gear wheels 22 are respectively disposed between the outer plate 24 and the drive shaft, said gear wheels mesh with the drive shaft.

A drive sleeve 40 having inner keys formed axially therein, and a first pair of engaging pegs 42 at its front end, is disposed around the front end of the drive shaft 30, the inner keys engaging said splined grooves, so that the drive sleeve is rotatable with the drive shaft.

The rear end of a driven shaft 50 has engaging pegs 51 to compliment and engage those 42 of the drive sleeve 40. The front end of the driven shaft has a pair of grooves 53 for receiving buffing balls 54 and a throughbore 52 for clamping a tool.

A coil spring 73 is disposed around the drive shaft to urge the drive sleeve 40 toward the driven shaft 50 so that the two sets of engaging pegs (42, 51) engage each other.

The clamping means 60 includes a sliding head with inner wall having an annular protrusion 61 therein, so that when the sliding head is sleeved on the front end of the driven shaft 50, the annular protrusion lodges the balls 54 in the groove 53, thereby the throughbore 52 firmly clamps a tool bit.

Figure 6:
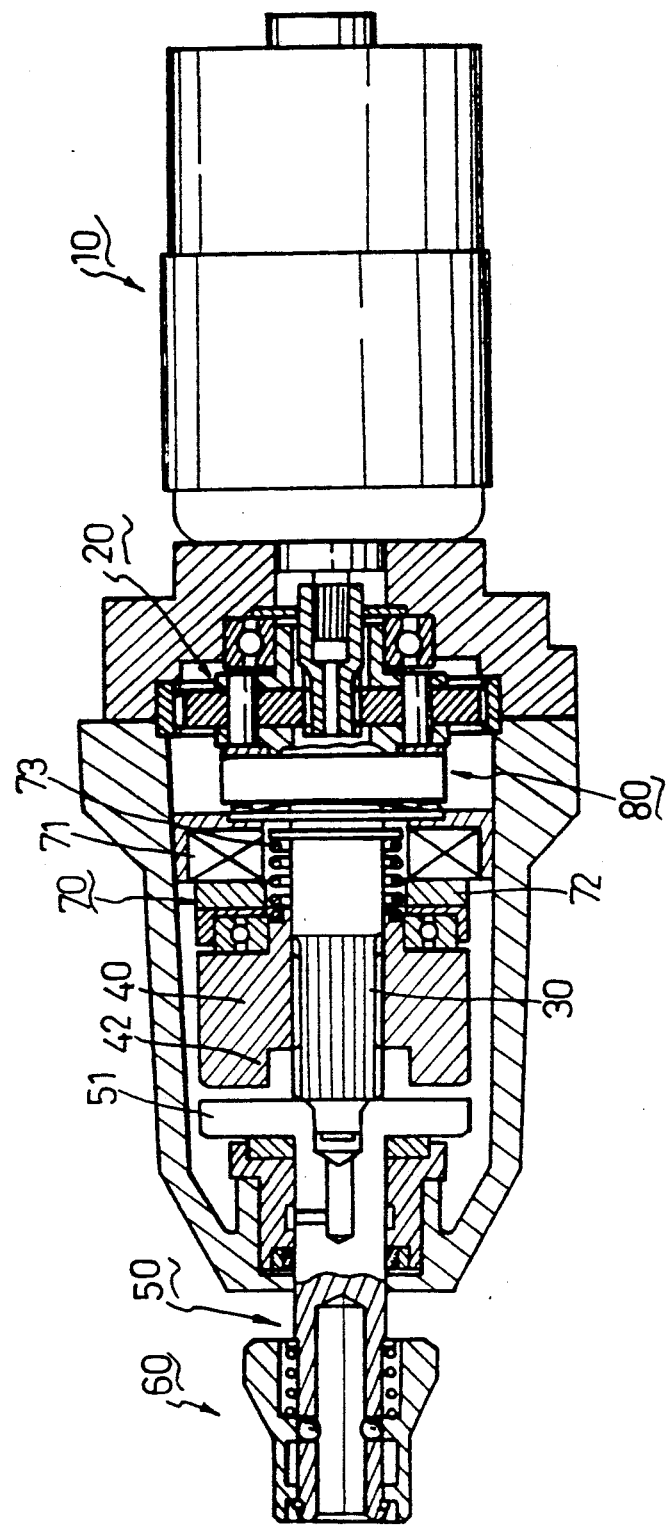

The electromagnetically controlled clutch 70 includes a plurality of electromagnet members 71 provided around the rear end of the drive shaft 30, a plurality of temporary-magnetizable members 72, made mostly of soft magnetic material, provided around drive shaft 30 at the rear end of the drive sleeve, adjacent to said electromagnet members (71). The temporary-magnetizable members (72) are not rotatable with the drive sleeve (40), but are movable axially with the drive sleeve (40), because a bearing 74 is disposed between the rear end of the drive sleeve 40 and the temporary-magnetizable members 72. A non-magnetic member 75, like an aluminum disc, is disposed between the bearing 74 and the temporary-magnetizable members 72 so that the drive sleeve will not be magnetized by the electromagnet members 71. The set of temporary-magnetizable members 72 is attracted by and moves toward the electromagnet members 71, against the force of coil spring 73, when the drive shaft 30 is rotated at a slower rate than a predetermined speed, at which time the electromagnet members 71 are energized by actuation of a centrifugally controlled switch 82 mounted on the drive shaft 30. The switch 82 is actuated by a swinging means 81, also mounted on the drive shaft. The result is that the drive sleeve 40 disengages from the driven shaft 50, as shown in FIG. 6.

When the drive shaft 30 continues to rotate and its speed is increased to a predetermined rate of rotation, the centrifugal swinging means 81 will actuate the centrifugal controlled switch 82 to de-energize the electromagnet members 71, causing said temporary-magnetizable members 72 to lose their magnetism. Thus, the drive sleeve 40, which the temporary-magnetizable members 72 are fixed to, is moved toward and engages the driven shaft 50 under impetus of the biasing force of the coil spring 73, so that the driven shaft 50 is rotated. When the the drive shaft 30 is slowed down to a rate slower than the predetermined rate of rotation, as a result of a load exerted on the driven shaft 50, the centrifugal controlled switch 82 energizes the electromagnet members and causes the drive sleeve 40 to disengage the driven shaft 50.

Figure 4A:
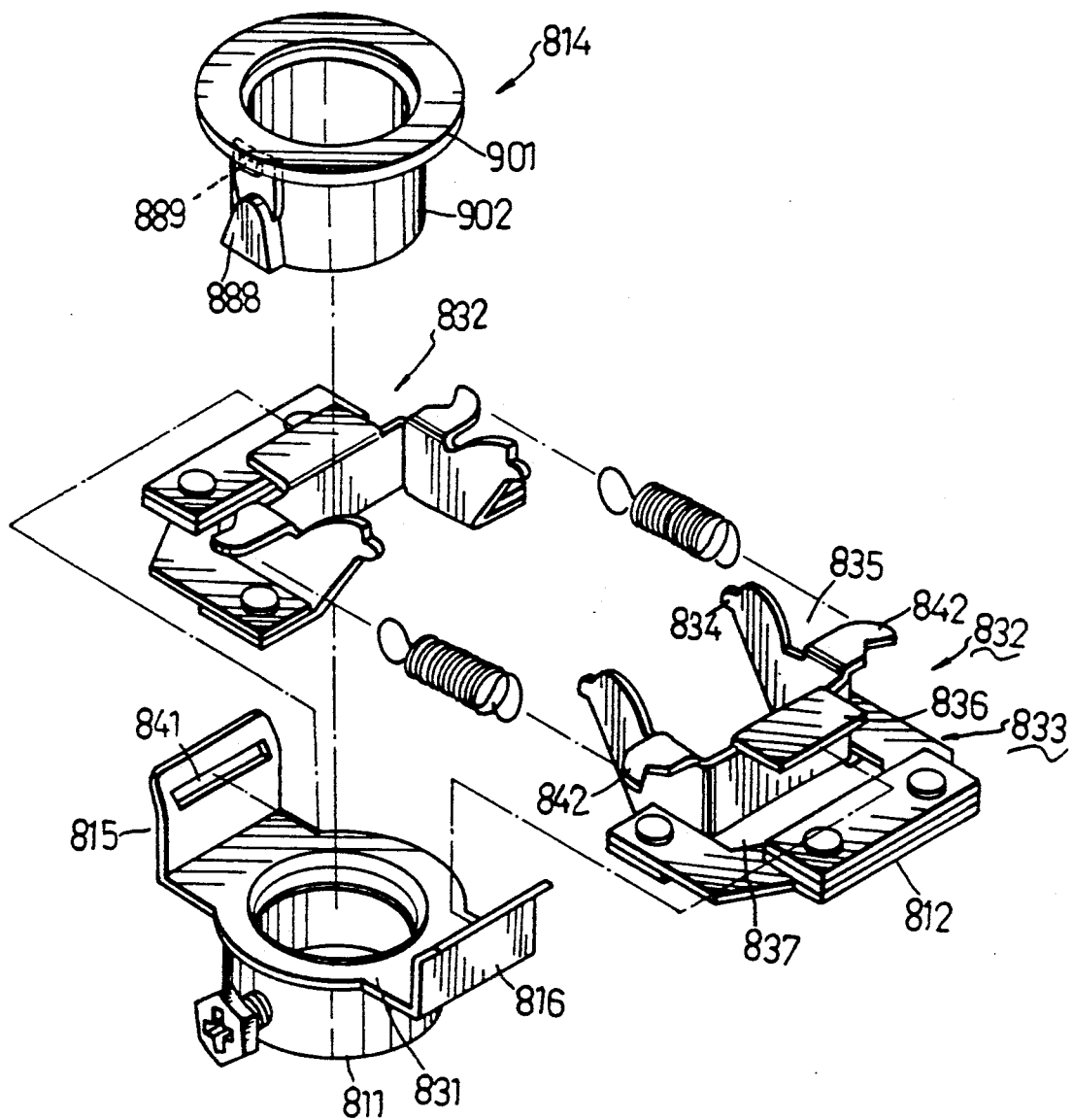
FIGS. 4 and 4(A) are detailed views of a preferred embodiment of an electric wrench according to the present invention.
Figure 4:
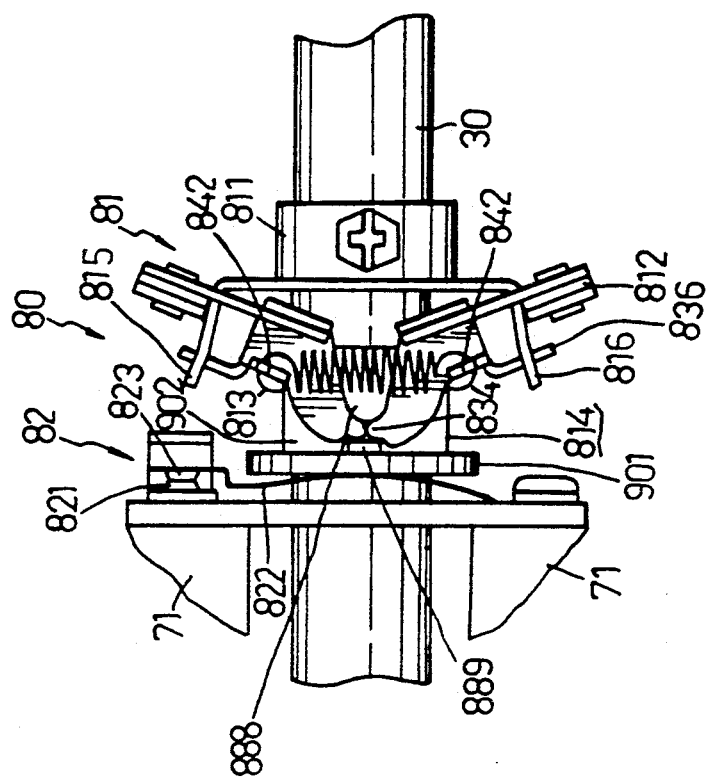
Figure 5:
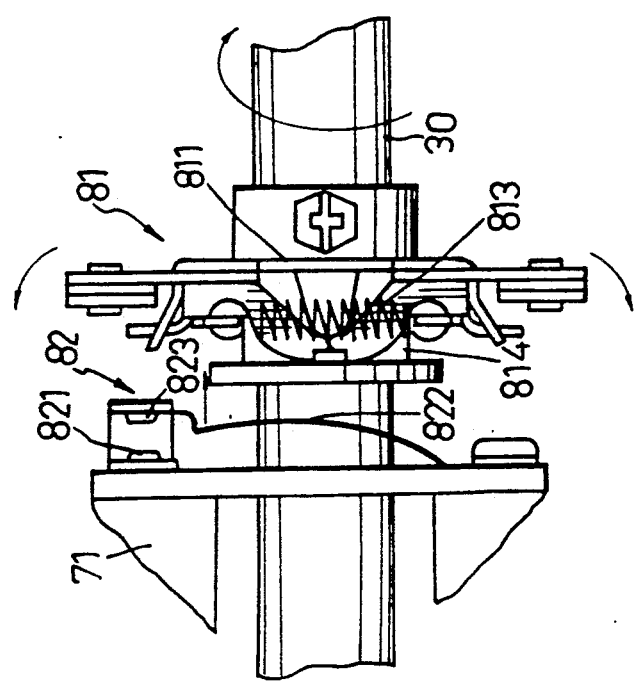
FIG. 5 is a detailed view of the preferred embodiment of an electric wrench of FIG. 4 in operation.

The centrifugally controlled switch 82 for controlling the electromagnet members 71 includes a fixed contact member 821 provided adjacent to the electromagnet members 71, a movable contact member 823, and a resilient member 822 on which the movable contact is mounted, and a press member 814 movably mounted on the drive shaft 30 to press against the resilient member so as to cause the movable member 823 to contact the fixed contact member 821, as shown in FIGS. 4 and 5. The press member 823 is an annular flange 901 with a tubular member 902, and two pair of projections, one pair 889 diametrically extending on both sides of the flange 901 and the other pair 888 diametrically extending from the both sides of the tubular member 902.

Referring to FIGS. 4 and 4(A), the centrifugal swinging means 81, which includes an annular support 811, spaced apart from the press member 814, is sleeved and fixed on the drive shaft 30 to movably hold two swing members 832. The swing members 832 are of equal weight and are diametrically opposed one on each side of the drive shaft 30. The annular support 811 has two arms (815, 816) extending from the flange 831 of the annular support 811 in two diametrically opposite positions. Each of the swing members 832 is a substantially V-shaped plate 833 to which is attached a counter weight 812. Tabs 834 are formed on the two arms 835 of each of the plate 833, and each plate 833 has a tongue 836 disposed between and planarly perpendicular to the tabs 834. Each of the arms (815, 816) of the annular support 811 extends through the opening 837 of the V-shaped plate 833 and each of the tongue 836 extends through a slot 841 in the arms (815, 816). The tabs 834 of each swing member 832 extend towards the projection 889 and respectively contact the projection 888 of the press member. Each tab of one of the swing members 832 coincides each tabs of the other swing member at each projection (889, 888). The swing members so arranged are movable in radial and axial directions.

A torsion spring 813 is connected to between the flanges 842 of the adjacent tabs of the two swing members 832 to pull the adjacent tabs towards each other so that the tabs 834 are in tight contact with the projections (888, 889). The swing members can swing outward by the centrifugal force caused by the rotation of the drive shaft 30. The tension force of each spring 813 is so arranged that it allows each of the adjacent pairs of tabs to turn outward about the point of contact with the projection 888 when the speed of rotation reaches a predetermined high speed. When the tabs turn outward, they axially move away from the electromagnet members 71, against the force of the tension spring, thereby retracting the press member from the resilient member 822, at the same time permitting the movable contact member 823 to move away from the fixed contact member 821. The resilient member 822 does not cause electrical connection between the contacts (821, 823) when the resilient member 822 is at rest, as shown in FIG. 6. At this time, the coil spring 73 urges the drive sleeve 40 to the driven shaft 50, so the driven shaft 50 rotates at a high speed.

The rate of rotation of the driven shaft 50 is lowered by resistance from a workpiece. That slows the driven shaft and the torsion spring 813 overcomes the centrifugal force on the counter weights 812, thus pulling the tabs 834 back together which in turn causes the press member 814 to push on the resilient member 822, re-establishing the electrical contact, reenergizing the magnets and retracting the drive sleeve 40 from the driven shaft 50, so that the drive shaft 30 can regain the predetermined rate of rotation. Thus this wrench can use a low power motor while still providing high torsion at the beginning and the end of a given task.

While the invention has been described in connection with what is considered to be most practical and preferred embodiment, the invention is not to be limited to the disclosure only, but on the contrary, it is intended to cover various modifications and equivalent arrangements within the broadest interpretation of the present invention so as to encompass all such modifications and equivalent arrangements.

I claim:

1. An improved electric wrench comprising:

a housing;

a motor enclosed in said housing, said motor having an axle;

a transmission gear assembly connected to said axle of said motor for reducing the rotation speed of said motor so as to increase the torsion force of the same;

a drive shaft with a front end and a rear end, the rear end of said drive shaft being connected to said transmission gear assembly, and the front end of said drive shaft having a plurality of splined grooves formed axially thereon;

a drive sleeve having inner keys axially extending through the central bore thereof, said drive sleeve being disposed around said drive shaft, said inner keys engaging said plurality of splined grooves, a pair of engaging pegs extending axially from the front end of said drive sleeve;

a driven shaft having a pair of engaging pegs extending from its rear end, which pegs are adapted to compliment and detachably engage said pair of engaging pegs of said drive sleeve, the front end of said driven shaft having a clamping means for detachably holding a tool bit, said clamping means extending out of said housing;

a coil spring disposed around said drive shaft urging said drive sleeve against said driven shaft so that said two pairs of engaging pegs engage each other;

an electromagnetically controlled clutch including an electromagnet means provided around said rear end of said drive shaft and a temporary-magnetizable means provided around said rear end of said drive sleeve adjacent to said electromagnet means, said temporary magnetizable means being not rotatable with said drive sleeve but axially movable with said drive sleeve, said temporary-magnetizable means also being attractable by said electromagnet means and moving against the biasing force of said coil spring towards said electromagnet means when said electromagnet means is energized, thereby causing said drive sleeve to disengage from said driven shaft, a centrifugally controlled switch to de-energize said electromagnet means when said drive shaft reaches a predetermined rate of rotation, and to re-energize said electromagnet means when said drive shaft slows to a rate less than said predetermined rate of rotation; and A centrifugal swinging means for actuating said centrifugally controlled switch.

2. An improved electric wrench as claimed in claim 1, wherein said centrifugally controlled switch includes a fixed contact member provided adjacent to said electromagnet means, a movable contact member, a resilient member mounted on said drive shaft to hold and urge said movable contact member away from said fixed contact member, and a press member movably mounted on said drive shaft to depress said resilient member so as to make said movable contact member touch said fixed contact member, and wherein said centrifugal swinging means includes an annular support fixed to said drive shaft, spaced from said press member, said annular support having two arms extending in two diametrically opposite positions, two swing members each being mounted pivotally on one of said arms and extending between said press member and said annular support, each of said swing members having an inner end and an outer end, said inner ends converging towards said press member, said outer ends diverging towards said arms, and a means for urging said inner end towards so as to depress said press member when the system is at rest, said means interconnecting said inner ends, said inner ends moving away from said press member and said resilient member when said outer ends of said swing member swing away from one another as a result of said drive shaft reaching said predetermined rate of rotation, and urging said inner ends of said swing members to push said press member against said resilient member when said drive shaft rotates slower than said predetermined rate of rotation.

3. An improved electric wrench as claimed in claim 1 wherein a bearing is disposed around said drive shaft between said temporary-magnetizable means and said drive sleeve so that said temporary-magnetizable means is not rotatable with said drive sleeve but axially movable along said drive sleeve, a non-magnet member being disposed between said bearing and said temporary-magnetizable means so that said drive sleeve is not magnetized by said electromagnet means when said electromagnet means is energized.

* * * * *